UNITED STATES PATENT OFFICE.

FRANCIS J. McELHONE, OF JERSEY CITY, NEW JERSEY.

ELECTROPLATING PROCESS.

1,018,332.      Specification of Letters Patent.      Patented Feb. 20, 1912.

No Drawing.      Application filed March 26, 1908. Serial No. 423,358.

*To all whom it may concern:*

Be it known that I, FRANCIS J. MCELHONE, a citizen of the United States, and a resident of Jersey City, in the county of Hudson and State of New Jersey, have invented a new and Improved Electroplating Process, of which the following is a full, clear, and exact description.

This invention relates to electroplating or electrotyping.

In preparing an electrotype, a mold or case is usually made in a plastic material and covered with graphite or "black lead" to render the same conductive when placed in the plating bath. It is found, however, that it is expedient to increase the conductivity of the graphite coat in some manner, so that the formation of the deposit will commence at once. It is also found that with the graphite used for this purpose, there is a tendency to form "pin holes" or unplated spots on the face of the case. It has been customary heretofore, to treat the "leaded" cases with sulfate of copper and iron filings, to increase the conductivity so that plating will commence at once when the case is placed in the bath. This practice tends to scratch the case, which produces defective electrotypes. Electrotypes are also made on a soft metal, such as lead, by impressing its face to make a mold. Graphite is applied to molds of this kind to form a dividing coat which will enable the deposited electroplate to be "relieved," or removed from the metal body of the mold.

The object of this invention is to provide a process for improving the conductivity of the coat of the case or mold and to overcome the tendencies in the graphite to produce pin-holes and similar defects.

The invention consists in the process to be described more fully hereinafter and particularly set forth in the claims.

In carrying out my process, I prepare a solution of pyrogallic acid by mixing about two hundred grains to a gallon of water. This acid is an organic acid and an oxygen acid of the carbocyclic group. While I prefer to use pyrogallic acid, I may use tannic, gallotannic acid or gallic acid for my purpose. With this solution I mix about eight pounds of graphite and stir the mixture until the graphite becomes thoroughly wet and pasty. I then pour in large quantities of water and stir thoroughly to wash the acid from the graphite. I then collect the graphite by decanting and filtration. The graphite after washing, is thoroughly dried and is then put on the face of the mold in a dry condition in any of the well known ways, such as by means of a brush or blast. If desired, the graphite may be applied to the mold without being dried after washing, according to the wet process described in my aplication Serial No. 373,046, filed May 11, 1907.

The treatment of the graphite with the acid as described above, seems to change its condition advantageously, rendering it more conductive and overcoming its normal tendency to form bubbles of oxygen or air which make "pin-holes" or similar defects in the plate.

Having thus described my invention, I claim as new and desire to secure by Letters Patent:

1. The process which comprises treating graphite with an organic acid prior to applying said graphite to a mold, washing thereafter, and electroplating thereafter.

2. The process which comprises treating graphite with an organic acid, drying the graphite, applying the graphite to a mold, and electroplating the said mold thereafter.

3. The process which comprises treating graphite with an organic acid, washing the graphite after treatment with said acid, applying the graphite to the mold and electroplating thereafter.

4. The process which comprises treating graphite with an acid of the carbocyclic group, washing the acid from said graphite, applying the graphite to a mold, and electroplating said mold.

In testimony whereof I have signed my name to this specification in the presence of two subscribing witnesses.

FRANCIS J. McELHONE.

Witnesses:
F. D. AMMEN,
EVERARD B. MARSHALL.

Copies of this patent may be obtained for five cents each, by addressing the "Commissioner of Patents, Washington, D. C."